Aug. 28, 1962  R. T. BURNETT  3,051,272
IMPROVEMENT FOR DISK BRAKE STRUCTURE
Filed June 3, 1959  5 Sheets-Sheet 3
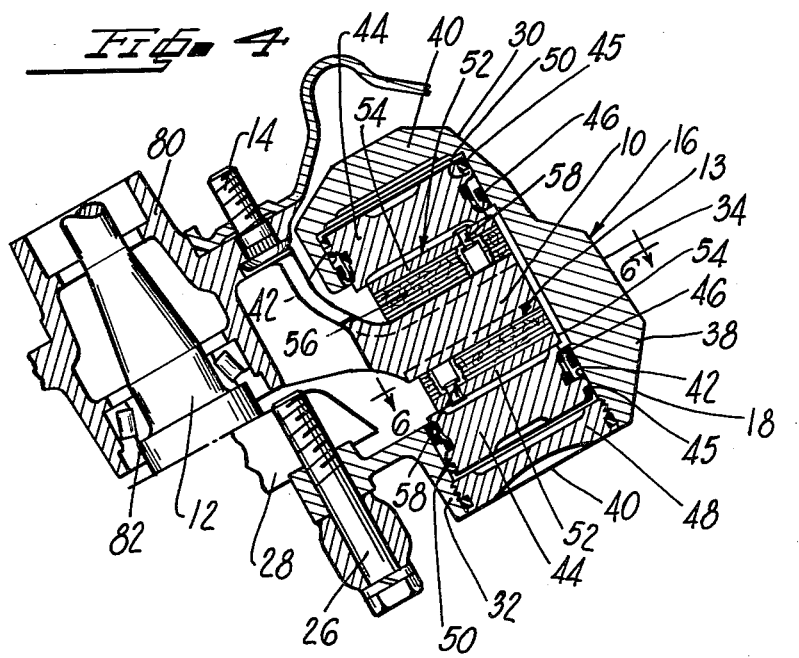
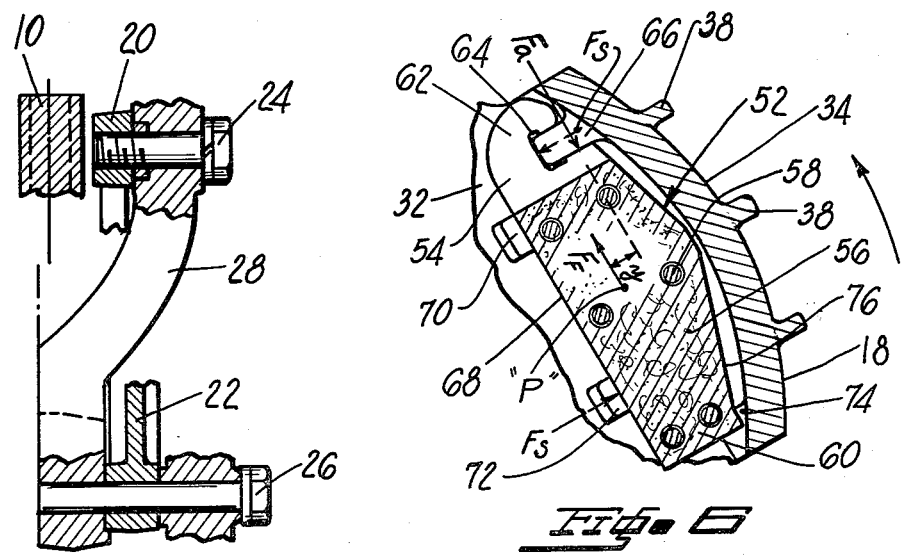
INVENTOR.
RICHARD T. BURNETT
BY John A. Young
ATTORNEY Aug. 28, 1962   R. T. BURNETT   3,051,272
IMPROVEMENT FOR DISK BRAKE STRUCTURE
Filed June 3, 1959   5 Sheets-Sheet 4

INVENTOR.
RICHARD T. BURNETT
BY John A. Young
ATTORNEY

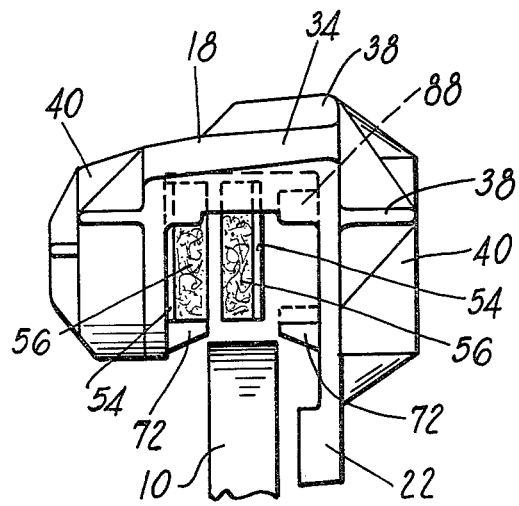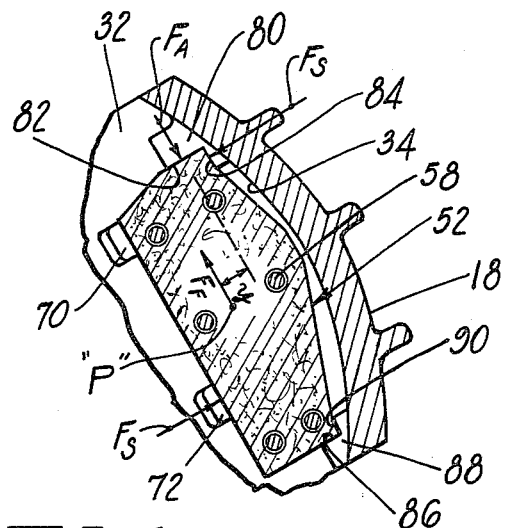

United States Patent Office 3,051,272
Patented Aug. 28, 1962

3,051,272
IMPROVEMENT FOR DISK BRAKE STRUCTURE
Richard T. Burnett, South Bend, Ind., assignor to The Bendix Corporation, a corporation of Delaware
Filed June 3, 1959, Ser. No. 817,823
5 Claims. (Cl. 188—73)

This invention relates to a brake and more specifically to a vehicle brake which is of the caliper disk type construction. The caliper disk brake has many inherent advantages over shoe type brakes, these advantages being mostly in the areas of brake controllability, improved stability and better resistance to fade or loss in brake effectiveness owing to braking heat. One of the chief obstacles to widespread adoption of the caliper disk brake is the greater cost in manufacturing and servicing the brake as compared with the arcuate shoe brake, and the reason for this lies in the numerous expensive machining operations which are required in those caliper brake constructions which have been proposed.

Accordingly, it is one of the objects of the present invention to provide a cast housing caliper construction which is more economical to produce and is adapted to large scale manufacture.

It is a further object of the invention to provide for locating and anchoring of the friction members within the caliper housing by means of structures which can be easily held within required manufacturing tolerances by virtue of their construction and without necessitating costly machining operations.

It is a further object of the invention to effect both anchoring of the friction member and confining of the friction member within the housing against turning by means of structures which need not be precisely located relatively to each other so that greater manufacturing tolerances may be permitted.

It is further provided that the braking force produces a turning effect on the friction member which tends to hold the friction member in a given position so as to prevent brake noise.

It is a further object of the invention to simplify the structure necessary for accomplishing anchoring and confining of the friction member against radial movement, and to combine these functions with a single casting structure. It is also intended that the remaining components of the brake be correspondingly simplified and reduced in number to produce a minimum cost brake assembly.

Another object of the invention is to facilitate assembly and servicing of the brake wherein the friction pads can be easily moved into and out of operative position within the caliper housing. It is possible to accomplish such servicing and assembly without completely detaching the caliper housing but this is an ancillary feature of the general object.

Other objects and features of the invention will become more apparent from a consideration of the following description which proceeds with reference to the accompanying drawings, wherein:

FIGURES 3, 4 and 5 are section views taken on the respective section lines indicated in FIGURE 2;

FIGURE 6 is a section view taken on line 6—6 of FIGURE 4 and includes the anchoring and stabilizing forces which develop during brake application;

FIGURE 7 is the same as that of FIGURE 2 but showing the housing swung upwardly on one of the mounting legs to a position enabling removal of the friction members to service the brake, one of the friction members shown being removed;

FIGURE 10 is a section view similar to FIGURE 6 but showing a somewhat different means for guiding and confining the friction member within the housing; and, FIGURE 11 is an end view of the housing shown in FIGURE 10 in which one of the friction members is located midway between the sides just before withdrawal or just following insertion of a new friction member.

Figure 1:
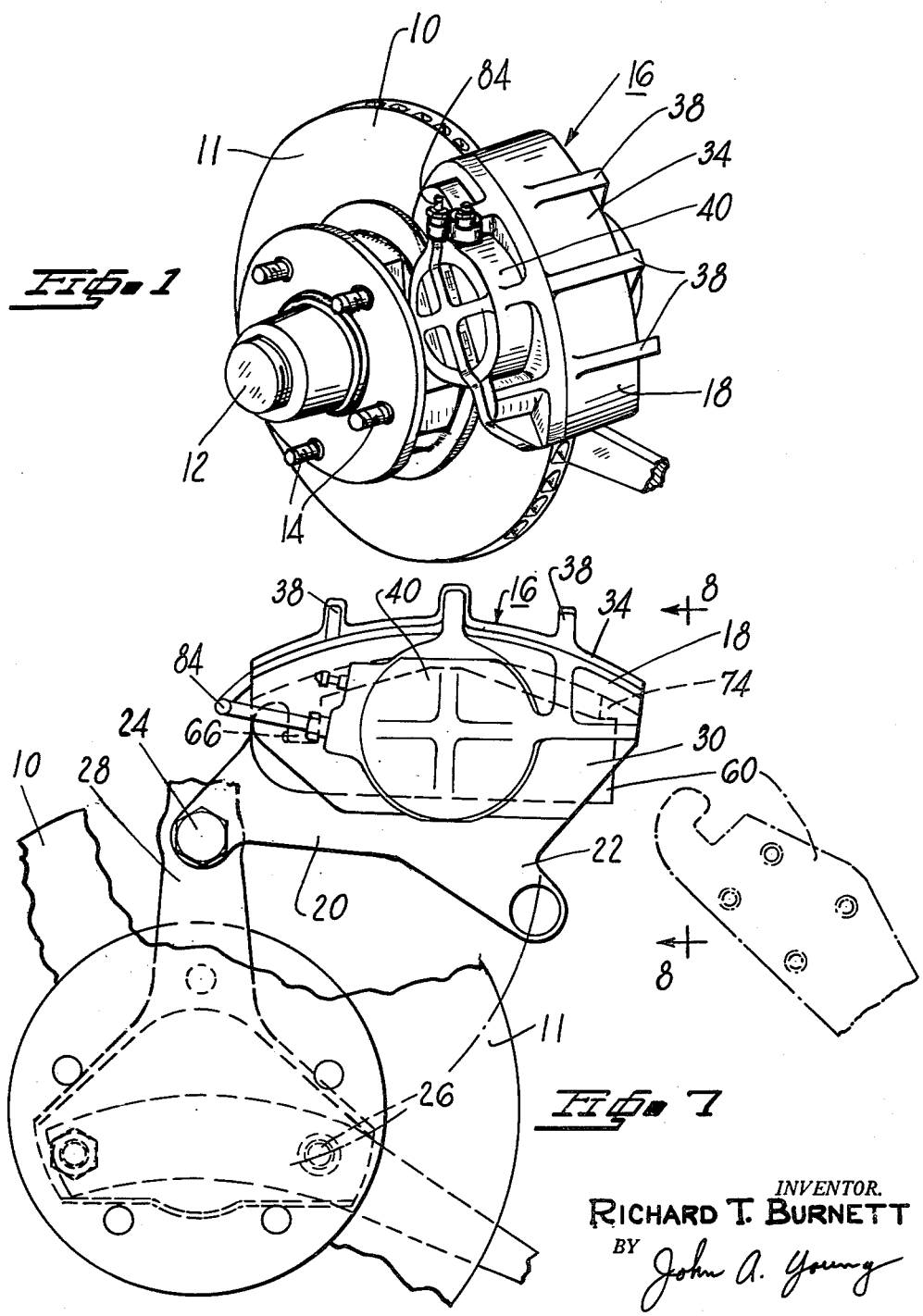
FIGURE 1 is an isometric view of the brake including the housing mounted on the rotor.
Figure 2:
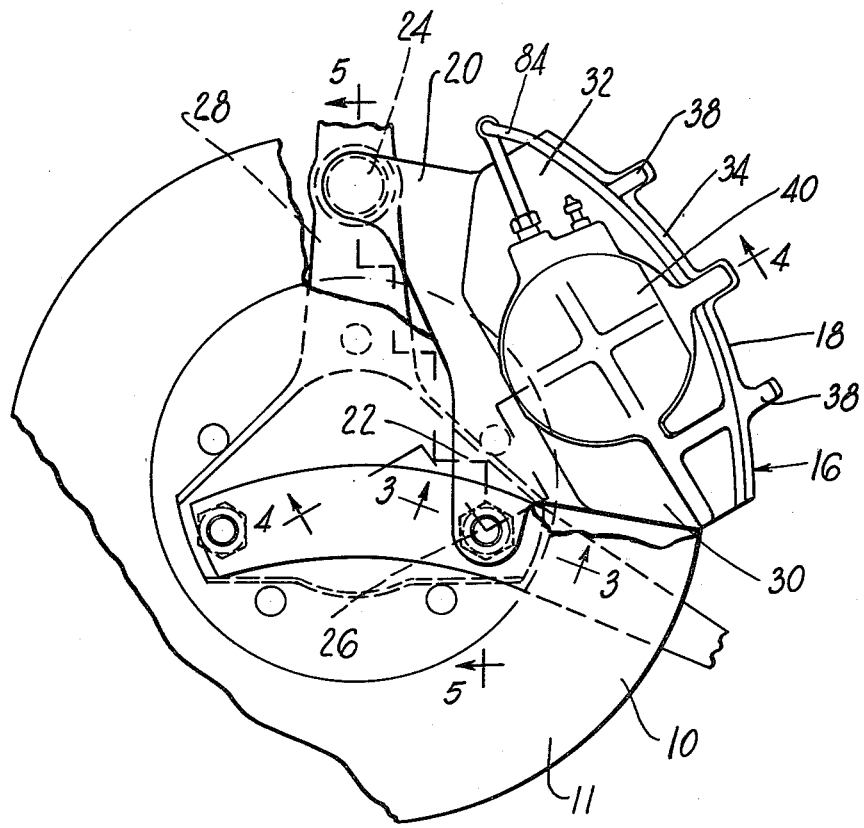
FIGURE 2 is a side elevation view of the brake in FIGURE 1 viewed from the outboard side, a part of the rotor being broken away to show details of the mounting for the housing.
Figure 3:
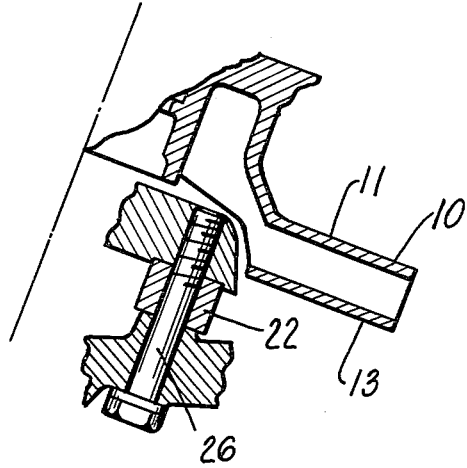

Referring now to the drawings and specifically FIGURES 1, 2 and 4, a rotor 10 is mounted for rotation on the axle spindle 12, the automobile wheel being shown removed in FIGURE 1 from the mounting studs 14 to better show the brake structure. The brake assembly, designated generally by reference numeral 16, comprises a housing 18 which is a casting having two angularly spaced support legs 20 and 22, secured by bolts 24 and 26 to projections 28 of the spindle 12. The housing comprises two laterally spaced sides (FIGURES 2, 4 and 9) 30, 32 which are joined together by an arcuate portion 34 located radially beyond the outer periphery of the rotor 10. The portion 34 rigidly holds the two sides 30 and 32 in closely spaced relationship with the opposite disk surfaces 11 and 13 of the rotor 10 so that the sides will not distort excessively. A plurality of spaced ribs 38 impart rigidity to the housing for stiffening the sides thereof. Each side 30, 32 has an integral boss 40 with a cylinder bore 42 (FIGURE 4) formed therein. The machining of the cylinder bores 42 is accomplished at the side 32, the opening being formed completely through the boss 40 at the side 32 and then extending within the boss in side 30.

A fluid pressure responsive piston 44 having a square cross section O-ring seal 45 and boot 46 is received in each cylinder bore 42. The cylinder bore 42 in side 32 is sealed by means of a threaded plug 48 in the manner indicated in FIGURE 4.

Figure 8:
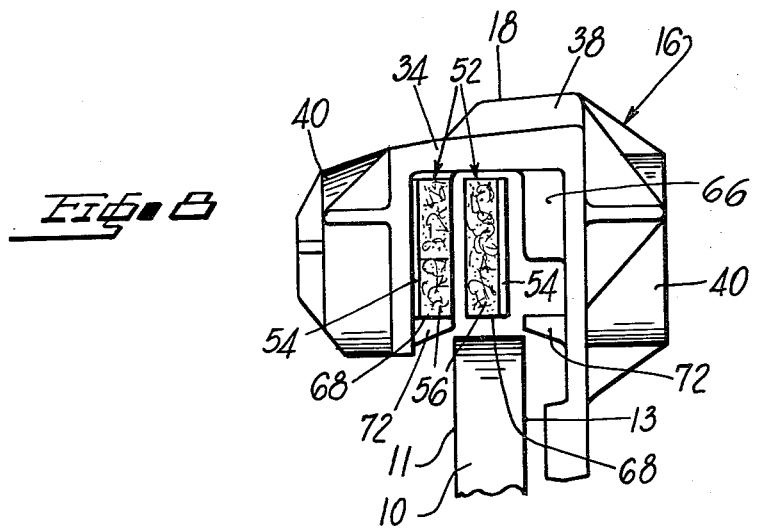
FIGURE 8 is an end view of the housing looking in the direction of the arrows 8—8 in FIGURE 7 and illustrating how the friction member is first disengaged and then removed through the end of the housing; or reversely, how a new friction member is inserted in the end and then slipped into place.
Figure 9:
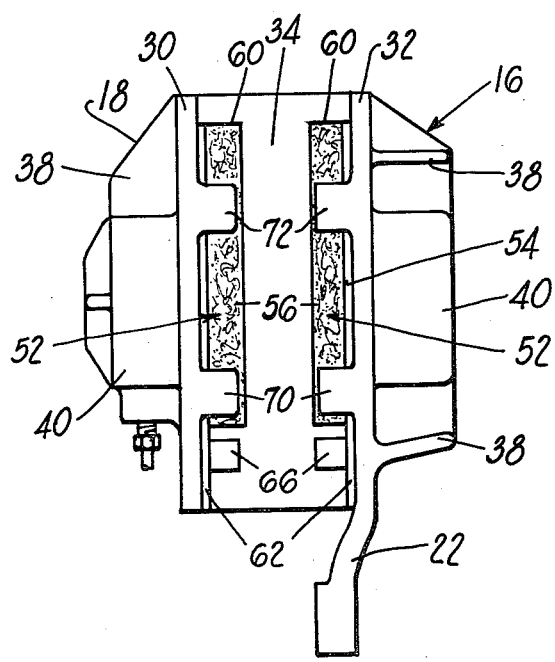
FIGURE 9 is a bottom view of the housing with the friction members in their operative positions.

The bearing between each piston 44 and the cylinder bore 42 is by means of a relatively narrow land 50 which allows a limited cocking movement of each piston 44 during braking operation. Between each piston 44 and the rotor 10 is a friction member 52 consisting of a backing 54 and a segment of friction material facing 56 which is secured to the backing by rivets 58, the particular means of securement not being essential to the invention. The friction member 52 is tapered (FIGURE 6) so that it achieves its minimum width at end 60 and at end 62 there is formed a slot 64 which receives an anchoring boss 66. The two anchoring bosses 66 (FIGURES 6, 8) are constructed integrally with the sides 30, 32 and the arcuate portion 34 to form extensions at the interior surfaces of the housing at one end of the housing. The slot 64 is notched at its base to provide extra clearance enabling the end 62 of the friction member to turn slightly on the anchoring boss 66. The bottom edges 68 of the friction members rest on lugs 70, 72 which slidably support the friction members as they move into and out of engagement with the opposing faces 11, 13 of the disk 10, the lugs 70, 72 being spaced apart extensions formed integrally with the interior surfaces of sides 30, 32 (FIGURE 9). Ledges 74 constructed integrally with the arcuate portions 34 of housing 18 engage the upper edges 76 at ends 60 of the friction members 52 to limit turning movement of the friction members about their respective anchoring bosses 66.

It should be noted that the tapered end 60 of each friction member is proportioned so that it fits closely between lug 72 and ledge 74 so that "clocking" of the friction member about anchoring boss 66 in which the end 60 rocks back and forth between lug 72 and ledge 74 is substantially prevented. Additional considerations regarding the "clocking" tendency will be later explained. The general outline of the friction member 52 is designed so that the lining 56 will wear approximately evenly from one remote end to the other and from the radially inner to the radially outer edges. In addition to the shape of the segment, the thickness of friction material segment 56 is significant in that a reasonable wear period is expected before replacement is necessary.

The piston 44 is located relatively to the associated friction member so that the center of input pressure is at the point "P" (FIGURE 6). It will be noted that this point "P" is not at the geometrical center of the friction material segment but is offset in the direction of forward rotation of the rotor 10 as indicated by the arrow in FIGURE 6, and is radially inward from the geometrical center, the purpose being to equalize the wear across the surface of the lining segment 56. The amount of offset is determined in the manner described in my issued Patent No. 2,862,580 dated December 2, 1958.

Still referring to FIGURE 6, during braking the frictional force developed by the rotor on the friction member is represented by the arrow labeled $F_f$. The force $F_f$ acts through the point "P" which is the center of pressure developed by the piston 44 on the friction member. The frictional force is opposed by an equal and opposite resistance from the anchoring boss 66, the location, magnitude and direction being represented by the arrow labeled $F_a$. The two equal and opposed forces $F_f$ (the frictional force) and $F_a$ (the anchoring force) develop a couple which is resisted by an equal opposing couple developed from stabilizing force $F_s$ from the anchoring boss 66 and a similar force $F_s$ at the mounting lug 72. The notched portion of the slot 64 permits slight turning movement of the friction member so that the friction member can bear against ledge 72. The described locations of forces tends to maintain the lower edge of the friction member 52 in constant engagement with ledge 72 so that between successive stops during forward vehicle movement the friction member is not moved angularly to impinge against any other structure. In this way brake noise is prevented.

During braking with forward rotor rotation, the friction member is under compression. When the direction of rotor rotation is reversed, however, the direction of the forces $F_f$ and $F_a$ also change in direction although the force $F_f$ still acts through the center of pressure "P." The anchoring force $F_a$, however, develops its resisting force at the opposite side of the anchoring boss 66 so that the friction member 52 is now under tension. The resulting force couple is opposed by an equal force couple on the friction member 52 developed at lug 70 and ledge or abutment 74 so that the friction member is held against circumferential movement and is moreover constrained from turning movement during braking. Note, however, that the foregoing is accomplished without impeding free axial sliding movement of the friction member 52 into and out of engagement with the rotor 10. Also, the friction member 52 is free to tilt slightly on anchoring boss 66 so that the surface of the friction material segment 56 can conform with the opposing rotor surface. The pistons 44 in turn can rock slightly on the land 50 in order to follow up such tilting movement of the friction member 52.

To service the brake, it is only necessary to remove the bolt 26 which holds the mounting leg 22 in place (FIGURE 2) on the spindle projection 28 and then pivot the entire housing 18 upwardly (FIGURE 7) on bolt 24.

The housing is now held only by the mounting leg 20. The described angular movement of the housing 18 brings the friction members 52 radially beyond the outer periphery of the rotor 10. The friction members are now singly removed by simply laterally moving them, one at a time (FIGURES 7 and 8) until the slot 64 is fully disengaged from the anchoring boss 66 and edge 68 clears lugs 70, 72. In constructing the friction members it is necessary to proportion the width thereof so that it will clear the mounting lugs 70, 72 for removal through the end of the housing. Where it is desired to use thicker widths for the friction member, provision may be made by increasing the distance between the lugs by terminating them farther from the sides of the rotor, or by increasing the width of the rotor.

The friction member is removed through the end of the housing in the manner indicated in FIGURE 7 and replaced with a new friction member having a new liner segment 56. In order to effect removal of the friction member in the manner described, the friction member must be of a width less than the clearance provided between the ends of bosses 66 and lugs 70 and 72. From FIGURE 8 it will be seen that the end of the housing is open and the friction member may be taken out through the end. Also, the friction member 52 may be dropped from the housing 18 since the ledges or lugs 72 terminate with sufficient clearance therebetween allowing the friction member to drop free of the housing.

Servicing the lining by removing only the bolt 26 is merely a convenience. If it is desired to service the fluid motor as well as replace the friction material lining, then it is a simple matter to detach the mounting leg 20 by removing fastener 24 and the entire housing 18 is then lifted away from the rotor 10 to perform the necessary servicing operation, such as removal and replacement of the friction members, and reboring or cleaning the cylinder bores 42, etc. As shown in FIGURE 5, the mounting legs 22 and 24 are slightly spaced apart axially so that they will be adapted to the existing undercarriage structure where they are mounted. Interference with the steering knuckle is thereby avoided. The particular mounting used for the housing may be extensively adapted to fit the particular vehicle undercarriage. The present invention is not limited to the particular mounting arrangement but is only illustrative of a suitable means for the given vehicle structure. Modifications of the mounting may be made as dictated by the given undercarriage.

The rotor 10 which is made integral with the axial housing 80 is mounted for rotation on bearing 82 and an outer wheel bearing (not shown) is received on the spindle 12.

In operation, to retard the vehicle or bring it to a stop, fluid pressure is admitted to one or the other of the cylinder bores 42 and the resulting pressure is communicated through line 84 connecting the two cylinder bores 42 so that the pressure is equalized in each cylinder bore. The pistons 44 are biased toward the rotor 10 bringing the surfaces of friction material segments 56 forcibly against the opposed disk faces 11 and 13 of the rotor 10, thereby frictionally gripping the rotor 10 therebetween. The friction members 52 are held against rotation with the rotor by the associated anchoring bosses 66 and the friction members 52 are further constrained against turning movement in either direction about the anchoring bosses 66 by means of the lugs 72 in forward rotor rotation and by lugs 70 and abutment 74 in reverse rotor rotation. Friction members 52 are, however, substantially free to move laterally so that when the pressure is relieved, the friction members are caused to slidably retract from the rotor surface. No positive retraction means in the form of springs are required to disengage the friction members from the rotor sides since normal road jars and irregularities in the surfaces of the rotor are sufficient to substantially disengage the friction members from the rotor surfaces.

It will now be evident from the foregoing description that the housing 18 performs a number of functions in addition to that of providing slidable bearing surfaces for the pistons 44. For example, anchoring and guidance for the friction members is obtained by means of bosses, lugs and ledges which are all integrally formed with the housing. It is not essential that the anchoring bosses 66 be precisely located relatively to the lugs (ledges) 70, 72 and abutments 74 and for this reason the housing can be constructed as a casting and the finished product has manufacturing tolerances which can easily meet the dimensions of the friction members. In other words, it is only the width of the anchoring boss 66 which must be controlled with any degree of accuracy where there is a single anchor for the friction member, and no span of distances from the anchoring boss need be held within precise limits to receive the friction member. As a result, the entire housing is easily produced by casting procedures which can easily meet the only critical dimension, that being the width of the anchoring boss. No machining operation is required of the casting thus making for obvious economy, and obviating any necessity of making the housing in separate parts which are then bolted or otherwise secured together. If machining were required on these inner faces, it would be necessary to make the housing in two pieces which would be bolted together. Since the housing can be made in such a simple manner and combines all of the functions previously provided by separate parts, the net result is a lower cost product which still meets all of the functional requirements.

Referring next to the embodiment of FIGURES 10 and 11, the friction member 52 is supported on lugs 70, 72 which are formed integrally with the side of the housing 18. The end 54 of the friction member is fitted at its upper edge within a stepped anchor boss 80 which is constructed integrally with the side 32 and arcuate portion 34. The frictional force of braking, labeled $F_f$ passing through "P" (the center of pressure), is resisted by an anchoring force $F_a$ acting on the friction member at surface 82. The resulting force couple from $F_a$ and $F_f$ which are separated by the distance "y" is resisted by an opposing couple developed from forces $F_s$ which are located at lug 72 and surface 84 of anchor 80.

During reverse braking the direction of force $F_f$ is changed 180° but still acts through the point "P." In this case the anchoring force $F_a$ acts through surface 86 of stepped anchor 88 and the opposing couple is derived from surface 90 of anchor 88 and lug 70.

The linear dimension between anchors 80 and 88 is controllable by using present casting technique such as shell molding, and just as in the previous embodiment, the manufacturing tolerances do not preclude forming the housing as a single one-piece casting complete with all structures necessary for guiding, anchoring and retaining the friction member.

While the invention has been described in connection with only a selected example embodiment of the invention, it will be understood that this is illustrative of the invention and is not restrictive thereof. It it intended that such variations and revisions of the invention as are reasonably to be expected on the part of those skilled in the art, and which incorporate the herein disclosed principles, will be included within the scope of the following claims.

What is claimed is:

1. A brake comprising a rotor mounted for rotation at the radially inner portion thereof, a housing having means extending radially inwardly for attachment to a fixed member, said housing including two integrally constructed laterally spaced sides extending closely adjacent the opposite faces of said rotor and a transverse side located radially beyond the periphery of said rotor and interconnecting said sides, an anchor boss constructed at one end of each of said spaced sides and projecting toward the adjacent disk face, two friction members each including a rigid stiff backing and a lamination of friction material disposed for engagement with the opposing disk surface, each of said friction members having a notch at one end of the backing proportioned to receive a respective one of said anchoring bosses and slidable relatively thereto for substantially free movement of the friction material into engagement with the opposing surface of the disk, said notch having spaced edges which are effective one in each direction of rotation as anchoring surfaces in engagement with a respective one of said anchoring bosses, at least one supporting ledge formed integrally with each of the sides of said housing for slidably carrying the weight of the friction member and resisting turning of the friction member on said anchor boss, and an integral abutment formed in each of the sides of said housing and slidably engageable by the backing of the respective friction members to resist turning of the friction member on the associated anchor boss.

2. In a brake, a housing having laterally spaced apart sides and an integral arcuate portion interconnecting said spaced apart sides, support ledges constructed as integral lugs spaced along the lower edge of each of said sides, a friction member comprising a rigid backing and friction material facing secured thereto mounted for slidable movement on said lugs, an anchor boss constructed integrally with each of the sides of said housing, each of said friction members having a notch proportioned to receive a respective one of said anchor bosses and adapted for substantially free slidable movement thereon, said notch having spaced edges which are effective one in each direction of rotation as anchoring surfaces in engagement with a respective one of said anchoring bosses, abutment means constructed integrally with the housing at the arcuate end opposite said anchor bosses to engage the friction members for resisting turning movement thereof, said bosses being spaced sufficiently apart relatively to the width of said friction members to provide for lateral movement of the friction members disengaging said friction members from the anchor bosses, supporting ledges and abutments whereby the friction members are singularly removable from the housing through the open ends thereof.

3. In a brake, a U-shaped cross section housing, two laterally spaced anchoring bosses located interiorly of the housing at the end thereof, two friction members each having an apertured end portion having spaced edges and proportioned each to slidably receive one of said anchoring bosses against which one of the edges of said end portions of said friction members bear in compression or extend in tension during braking, and supporting ledges constructed integrally with the interior side of said housing to carry said friction members, said friction members being proportioned of sufficiently narrow axial width relatively to the spacing between said anchoring bosses to be disengageable from said anchor and mounting ledges and thereafter removable through the ends of the housing.

4. The brake structure in accordance with claim 3 wherein said aperture receiving the anchoring boss comprises a slot having spaced edges proportioned to embrace the sides of said anchoring boss and providing limited turning of the friction member thereon, and said mounting ledges are spaced along the length of said friction member and at the upper and lower edges thereof to limit said turning movement.

5. In a brake, a housing comprising two laterally spaced and relatively fixed sides, a connecting portion extending between the upper edges of said sides and holding said sides rigidly together, an enlarged boss integrally constructed in each of said sides and having a cylinder bore formed therein, a pressure responsive member slidably received in each of said cylinder bores for movement in opposed directions, an anchoring boss constructed integrally with the inner surface of each of the sides of said housing, spaced supporting lugs extending laterally from each of the lower edges of said sides to provide sliding vertical support, and an abutment formed along the upper edge of each of said sides at the end of said housing opposite to said anchoring boss, friction members, one on each of said sides, being slidably carried through said supporting lugs, each of said friction members comprising an elongated rigid backing with a slot having spaced edges providing anchoring surfaces in forward and reverse braking directions respectively, and proportioned to slidably receive the anchoring boss for resisting circumferential movement of said friction members in forward and reverse direction, respectively, said backing having a substantially straight lower edge in slidable engagement with said lugs establishing vertical support and resistance against turning of said friction members, a segment of friction material facing at the outer surface of said backing for securing said facing to said backing, said friction members being proportioned with an end portion adapted to fit between one of said supporting lugs and said abutment for engagement with each thereby preventing turning of said friction member.

References Cited in the file of this patent

UNITED STATES PATENTS

| | | |
|---|---|---|
| 2,790,516 | Weight et al. | Apr. 30, 1957 |
| 2,942,695 | Butler | June 28, 1960 |

FOREIGN PATENTS

| | | |
|---|---|---|
| 738,545 | Great Britain | Oct. 12, 1955 |
| 742,338 | Great Britain | Dec. 21, 1955 |